United States Patent
Lee et al.

(10) Patent No.: US 7,701,904 B2
(45) Date of Patent: Apr. 20, 2010

(54) ROAMING METHOD FOR MAINTAINING CONNECTIVITY THROUGH HETEROGENEOUS WIRELESS NETWORKS, AND SYSTEM FOR REALIZING THE SAME

(75) Inventors: Jenq-Kuen Lee, Hsinchu (TW);
Jyh-Cheng Chen, Hsinchu (TW);
Cheng-Wei Chen, Hsinchu (TW);
Chung-Kai Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1054 days.

(21) Appl. No.: 11/302,138

(22) Filed: Dec. 14, 2005

(65) Prior Publication Data
US 2006/0153125 A1    Jul. 13, 2006

(30) Foreign Application Priority Data
Dec. 15, 2004    (TW) .............................. 93138919 A

(51) Int. Cl.
*H04W 4/00* (2009.01)
*H04W 36/00* (2009.01)
*G06F 7/00* (2006.01)
*G06F 15/16* (2006.01)

(52) U.S. Cl. ................ 370/331; 370/328; 370/338; 455/436; 455/432.1; 455/438; 707/3; 707/6; 709/203; 709/209; 709/211

(58) Field of Classification Search ............... 455/41.2, 455/436, 435.2, 437, 438, 432.1; 370/328, 370/331, 338; 707/3, 6; 709/203, 209, 211
See application file for complete search history.

(56) References Cited

U.S. PATENT DOCUMENTS

| | | | |
|---|---|---|---|
| 2004/0152417 A1* | 8/2004 | Kim et al. .................. | 455/41.2 |
| 2005/0048972 A1* | 3/2005 | Dorenbosch et al. ........ | 455/436 |
| 2006/0019663 A1* | 1/2006 | Cuffaro et al. .............. | 455/436 |

\* cited by examiner

*Primary Examiner*—Un C Cho
(74) *Attorney, Agent, or Firm*—Ladas & Parry LLP

(57) ABSTRACT

A roaming method for maintaining connectivity between a client and a server through heterogeneous wireless networks includes the steps of establishing an initial connection between the client and the server through a first selected one of the heterogeneous wireless networks, detecting disconnection of the initial connection, and establishing a current connection between the client and server through a second selected one of the heterogeneous wireless networks upon detecting that the initial connection has been disconnected. A system, which includes the client and the server, for realizing the roaming method is also disclosed.

21 Claims, 11 Drawing Sheets

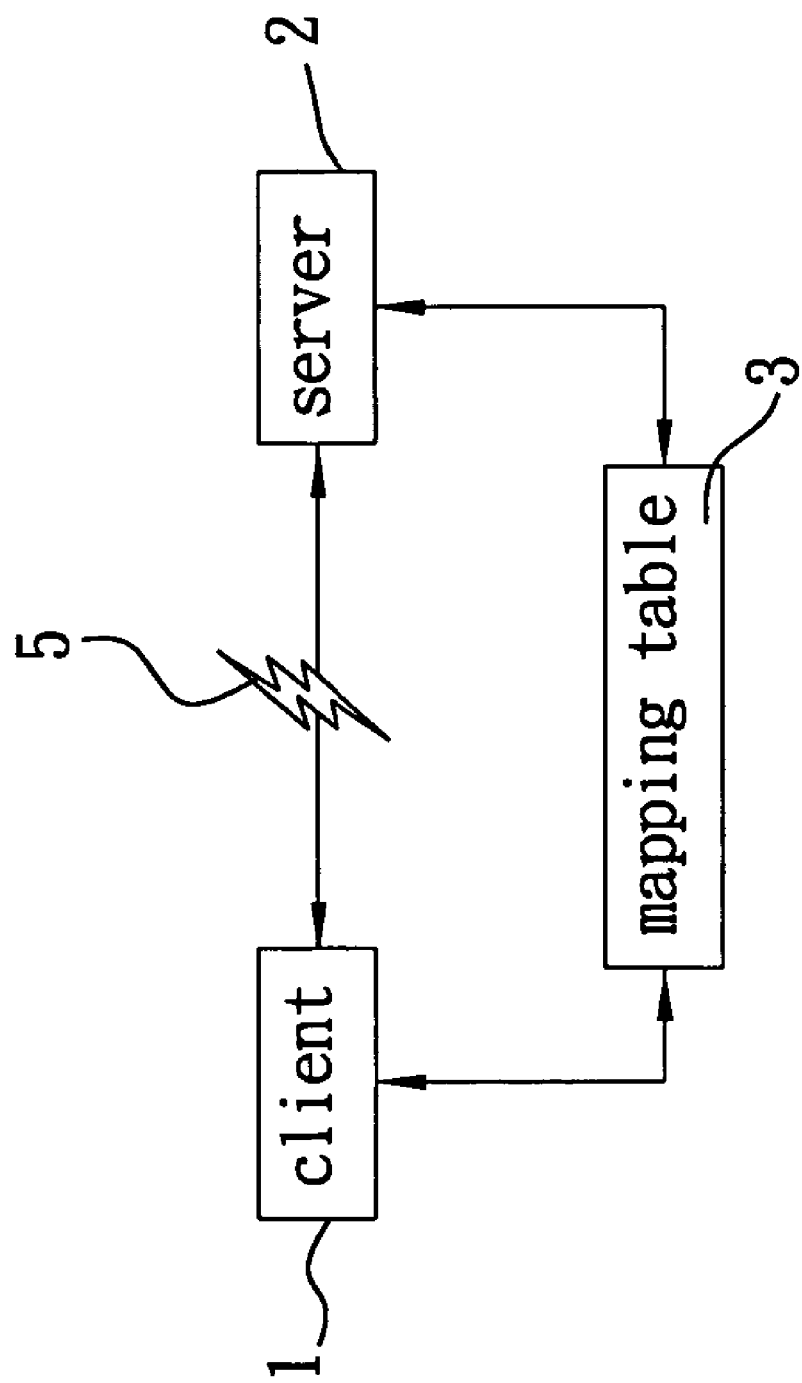
F I G. 1

ROAMING METHOD FOR MAINTAINING CONNECTIVITY THROUGH HETEROGENEOUS WIRELESS NETWORKS, AND SYSTEM FOR REALIZING THE SAME

CROSS-REFERENCE TO RELATED APPLICATION

This application claims priority of Taiwanese application no. 093138919, filed on Dec. 15, 2004.

BACKGROUND OF THE INVENTION

1. Field of the Invention

This invention relates to a roaming method for maintaining connectivity between a client and a server of a system through heterogeneous wireless networks.

2. Description of the Related Art

A conventional wireless device, such as a mobile phone or a personal digital assistant (PDA), that supports internet protocol (IP) connectivity is currently available in the marketplace. In a conventional method, such as the Mobile IP protocol, for maintaining an IP connectivity, the conventional wireless device uses two IP addresses, namely a home address and a care-of address, and requires the existence of a home agent and a foreign agent. The home address makes the conventional wireless device logically attached to its home network. When the conventional wireless device is not attached to its home network, and is therefore attached to a foreign network, the conventional wireless device is assigned with the care-of address. Whenever the conventional wireless device moves, the conventional wireless device registers its new care-of address to its home agent. To receive data packets, the home agent receives all the data packets destined for the wireless device via the home address, and delivers the data packets to the foreign network via the care-of address.

The aforementioned conventional method is disadvantageous in that the data packets are not directly sent to the conventional wireless device, and is applicable only for an IP-based wireless network.

SUMMARY OF THE INVENTION

Therefore, the main object of the present invention is to provide a roaming method for maintaining connectivity between a client and a server of a system through heterogeneous wireless networks.

Another object of the present invention is to provide a system that is capable of maintaining connectivity between a client and a server thereof through heterogeneous wireless networks.

According to one aspect of the present invention, a roaming method for maintaining connectivity between a client and a server through heterogeneous wireless networks comprises the steps of:

A) establishing an initial connection between the client and the server through a first selected one of the heterogeneous wireless networks;

B) detecting disconnection of the initial connection; and

C) establishing a current connection between the client and server through a second selected one of the heterogeneous wireless networks upon detecting that the initial connection has been disconnected in step B).

A system operable in heterogeneous wireless networks comprises a client and a server configured for establishing an initial connection therebetween through a first selected one of the heterogeneous wireless networks, and for establishing a current connection therebetween through a second selected one of the heterogeneous wireless networks upon detecting that the initial connection has been disconnected. As such, the client and the server are able to maintain connectivity therebetween through the heterogeneous wireless networks.

BRIEF DESCRIPTION OF THE DRAWINGS

Other features and advantages of the present invention will become apparent in the following detailed description of the preferred embodiment with reference to the accompanying drawings, of which:

FIG. 1 is a schematic view of the preferred embodiment of a system according to this invention;

DETAILED DESCRIPTION OF THE PREFERRED EMBODIMENT

Referring to FIG. 1, the preferred embodiment of a system according to this invention is shown to include a client 1 and a server 2.

The system further includes set of program instructions for enabling the client 1 and the server 2 to maintain connectivity therebetween through heterogeneous wireless networks 5, such as an internet protocol (IP) based network and a Bluetooth piconet, in a manner to be described hereinafter.

Figure 2:
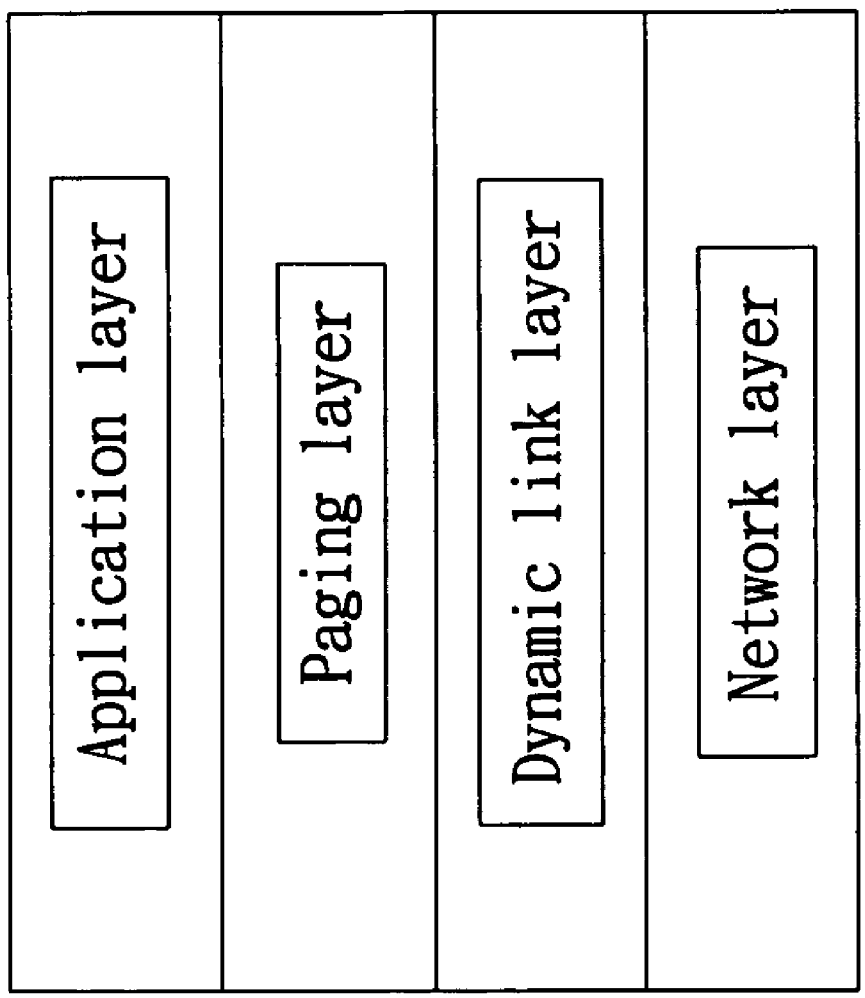
FIG. 2 is a schematic block diagram to illustrate a dynamic link layer of the preferred embodiment.

With further reference to FIG. 2, the system implements protocols in layers, namely application layer, paging layer, dynamic link layer, and network layer. Application software that provides network services is implemented at the application layer. The aforementioned program instructions are implemented at the dynamic link layer. It is to be noted below that the network layer a physical layer. Errors in the physical layer are intercepted and processed at the dynamic link layer.

The client 1 and the server 2 are configured for establishing an initial connection therebetween through a first selected one of the heterogeneous wireless networks 5, which will be hereinafter referred to as the first wireless network. In particular, each of the client 1 and the server 2 first selects the first wireless network. The client 1 then initiates a first connection request to the server 2 that contains a server address associated with the first wireless network. When the server 2 accepts the first connection request, the initial connection is established between the client 1 and the server 2. In this embodiment, the server address of the server 2 may be one of a dynamic internet protocol (IP) address, a fixed IP address, and a device address.

Figure 3:
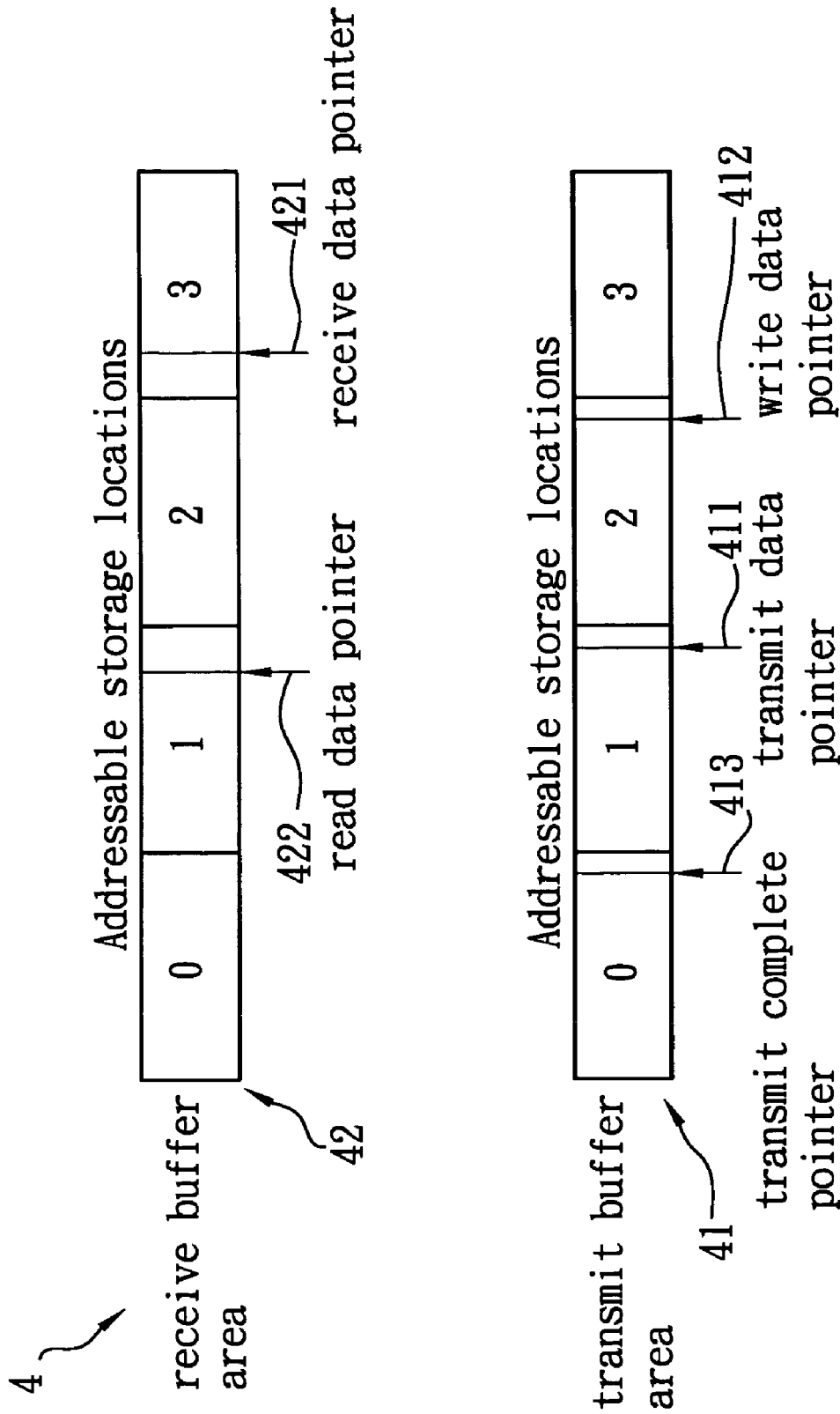
FIG. 3 is a schematic view to illustrate pointers used to track data packet transactions conducted in the preferred embodiment.

The client 1 and the server 2 are further configured for conducting data packet transactions therebetween through the initial connection. In particular, with further reference to FIG. 3, each of the client 1 and the server 2 is provided with a buffer device 4 for storing the data packets transacted therebetween. The buffer device 4 of each of the client 1 and the server 2 has a receive buffer area 42 for received data packets, and a transmit buffer area 41 for data packets to be transmitted. In this embodiment, each of the receive and transmit buffer areas 41, 42 of the buffer device 4 of the client 1 and server 2 has four addressable storage locations.

The client 1 and the server 2 are further configured to track addressable storage locations of transacted data packets in the buffer device 4 thereof.

In this embodiment, each of the client 1 and the server 2 tracks addressable storage locations using a receive data pointer, as indicated by arrow 421, a read data pointer, as indicated by arrow 421, a transmit data pointer as indicated by arrow 411, a write data pointer, as indicated by arrow 412, and a transmit complete pointer, as indicated by arrow 413.

The receive data pointer of the client 1 is associated with the receive buffer area 42, and points at the addressable storage location of the receive buffer area 42 at which a data packet is currently being received.

The read data pointer is associated with the receive buffer area 42, and points at the addressable storage location of the receive buffer area 42 at which a data packet is currently being read by the application software. It is noted that when the read data pointer is moved such that the read data pointer points at the addressable storage location of the receive buffer area 42 currently pointed at by the receive data pointer, reading operation of the application software from the receive buffer area 42 is temporarily disrupted.

The write data pointer is associated with the transmit buffer area 41, and points at the addressable storage location of the transmit buffer area 41 at which a data packet is currently being written by the application software.

The transmit data pointer is associated with the transmit buffer area 41, and points at the addressable storage location of the transmit buffer area 41 at which a data packet is currently being transmitted. It is noted that when the write data pointer is moved such that the write data pointer points at the addressable storage location of the transmit buffer area 41 currently pointed at by the transmit data pointer, writing operation of the application software in the transmit buffer area 41 is temporarily disrupted.

In this embodiment, each of the client 1 and the server 2 transmits a data packet only after a read complete signal is received. Moreover, each of the client 1 and the server 2 transmits the read complete signal only after the read data pointer is moved. As such, movement of the receive data pointer such that the receive data pointer points at the addressable storage location currently pointed at by the read data pointer is unlikely. Therefore, the data packet at the addressable storage location that is pointed at by the read data pointer, which is being read by the application software, will never be overwritten.

The transmit complete data pointer is associated with the transmit buffer area 41, and points at the addressable storage location of the transmit buffer area 41 at which a data packet is completely transmitted.

It is noted that movements of the receive data pointer, the read data pointer, the transmit data pointer, the write data pointer, and the transmit complete pointer are controlled by the application software.

In this embodiment, the client 1 and the server 2 are able to conduct dummy signal transactions therebetween through the initial connection when there are no data packets to be transacted through the initial connection.

The initial connection is deemed to be disconnected when a predetermined time period has elapsed since a latest signal transaction between the client 1 and the server 2. In particular, each of the client 1 and the server 2 transmits a data packet (or a dummy signal) within the predetermined time period. Each of the client 1 and the server 2 regards the initial connection to be disconnected when the predetermined time period has elapsed since a latest receipt of a data packet (or a dummy signal).

The client 1 and the server 2 are further configured to interrupt the data packet transactions therebetween upon detecting that the initial connection has been disconnected. That is, the client 1, after deeming the initial connection to be disconnected, ceases from transmitting of data packets. The same holds true for the server 2.

The client 1 and server 2 are further configured for establishing a current connection therebetween through a second selected one of the heterogeneous wireless networks 5, which will be hereinafter referred to as the second wireless network, upon detecting that the initial connection has been disconnected. In particular, the system further includes a mapping table 3 that is maintained by a mapping table server (not shown). During the initial connection, the server 2 registers the server addresses thereof to the mapping table 3 to obtain an identification code. The mapping table 3 maps the identification code obtained by the server 2 to the server addresses of the server 2. The server 2 transmits the identification code thereof to the client 1. When the initial connection is disconnected, the client 1 accesses the mapping table 3, and queries the mapping table 3 using the identification code of the server 2 so as to obtain the server address associated with the second wireless network. Thereafter, the client 1 initiates a second connection request to the server 2 that contains the server address obtained thereby from the mapping table 3. When the server 2 accepts the second connection request, the current connection is established between the client 1 and the server 2.

The client 1 and the server 2 are further configured for resuming the data packet transactions therebetween through the current connection with reference to the tracked addressable storage locations to ensure continuity of the data packet transactions therebetween. In particular, the server 2, during the current connection, transmits the receive data pointer thereof to the client 1. The client 1 determines the addressable storage location of the data packet that was transmitted thereby but was not received by the server 2 before the initial connection was disconnected based on the receive data pointer received from the server 2 and the transmit data pointer thereof. Thereafter, the client 1 resumes transmission of the data packet starting from the addressable storage location determined thereby and onward. Similarly, the client 1, during the current connection, transmits the receive data pointer thereof to the server 2. The server 2 determines the addressable storage location of the data packet that was transmitted thereby but was not received by the client 1 before the initial connection was disconnected based on the receive data pointer received from the client 1 and the transmit data pointer thereof. Thereafter, the server 2 resumes transmission of the data packet starting from the addressable storage location determined thereby and onward.

Figure 4A:
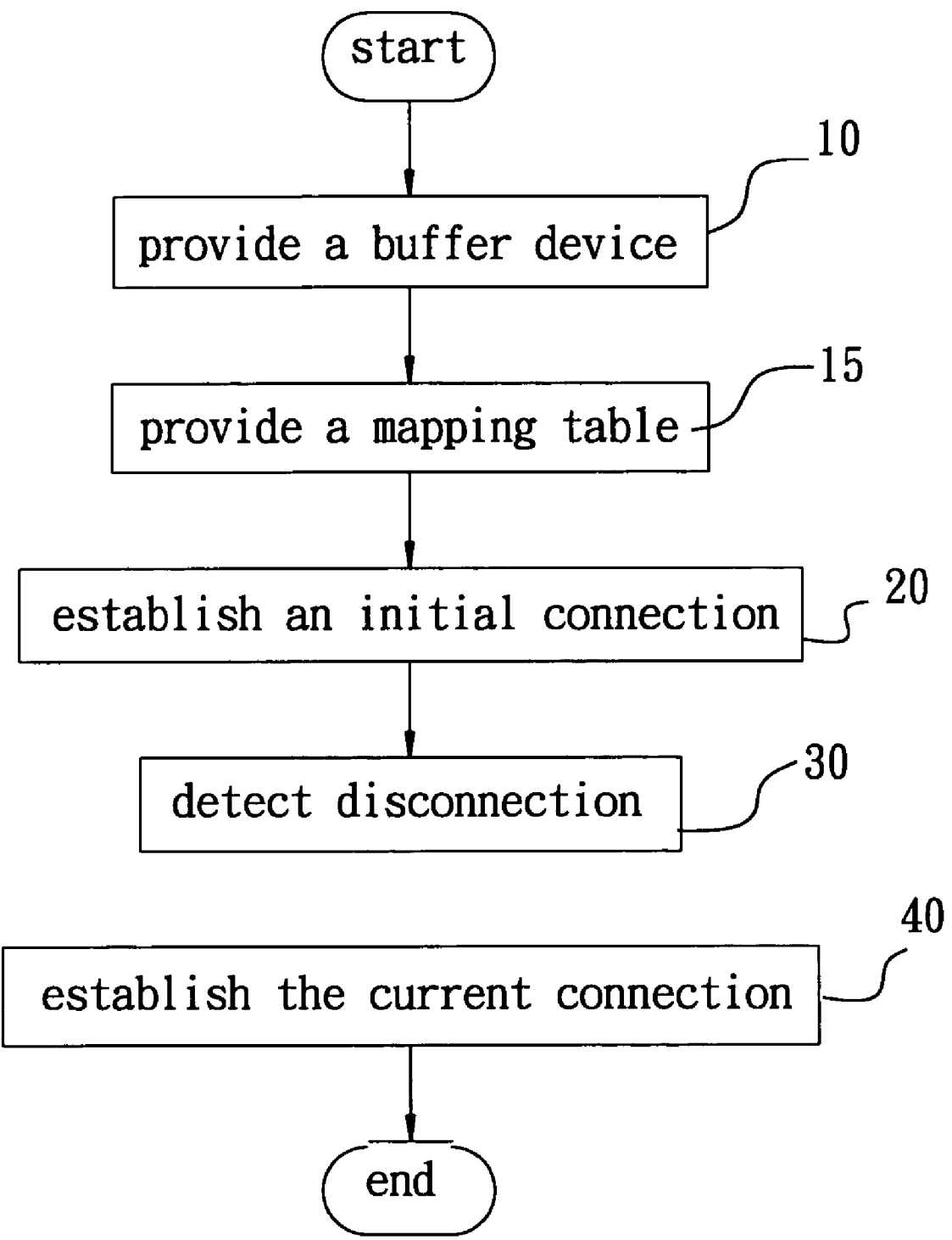
FIGS. 4A to 4H are flowcharts of the preferred embodiment of a roaming method according to the present invention.

The preferred embodiment of a roaming method for maintaining connectivity between the client 1 and the server 2 of the system through the heterogeneous wireless networks 5 according to this invention includes the steps shown in FIG. 4A.

The roaming method of this embodiment is implemented as a set of program instructions that is installed in the client 1 and the server 2.

In step 10, each of the client 1 and the server 2 is provided with the buffer device 4.

In step 15, the mapping table 3 is provided.

In step 20, the client 1 and the server 2 establish the initial connection therebetween through the first wireless network.

Figure 4B:
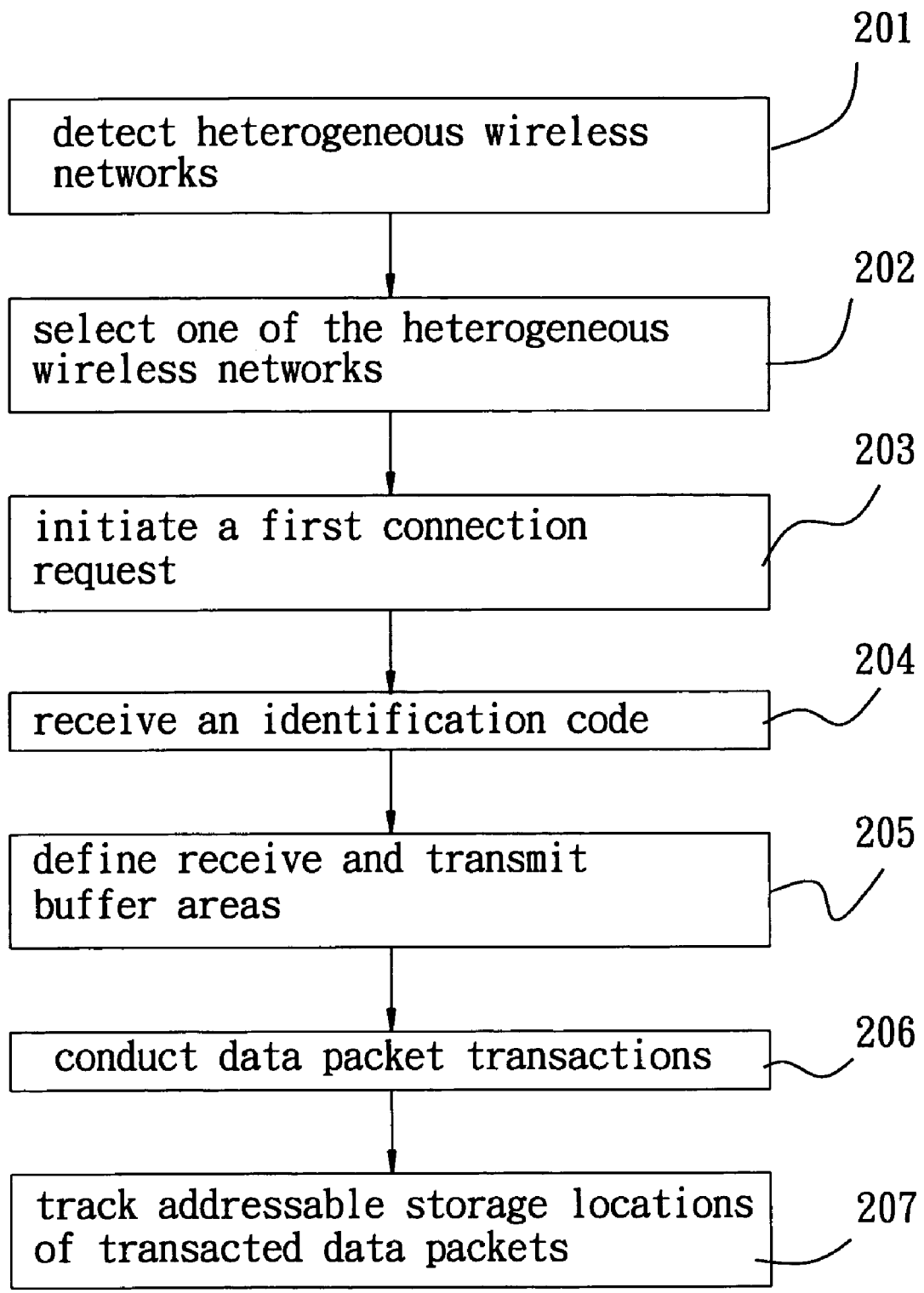

In this embodiment, with further reference to FIG. 4B, step 20 further includes the following sub-steps performed by the client 1:

sub-step 201: the client 1 detects the heterogeneous wireless networks 5;

sub-step 202: the client 1 selects one of the heterogeneous wireless networks 5, i.e., the first wireless network;

sub-step 203: the client 1 initiates the first connection request to the server 2 that contains the server address of the server 2 associated with the first wireless network such that the initial connection is established once the server 2 accepts the first connection request;

sub-step 204: the client 1 receives the identification code from the server 2 through the initial connection;

sub-step 205: the client 1 defines the receive and transmit buffer areas 42, 41 of the buffer device 4 thereof;

sub-step 206: the client 1 conducts data packet (or dummy signal) transactions with the server 2 through the initial connection; and sub-step 207: the client 1 tracks the addressable storage locations of transacted data packets in the buffer device 4 thereof using the aforementioned pointers thereof.

Figure 4C:
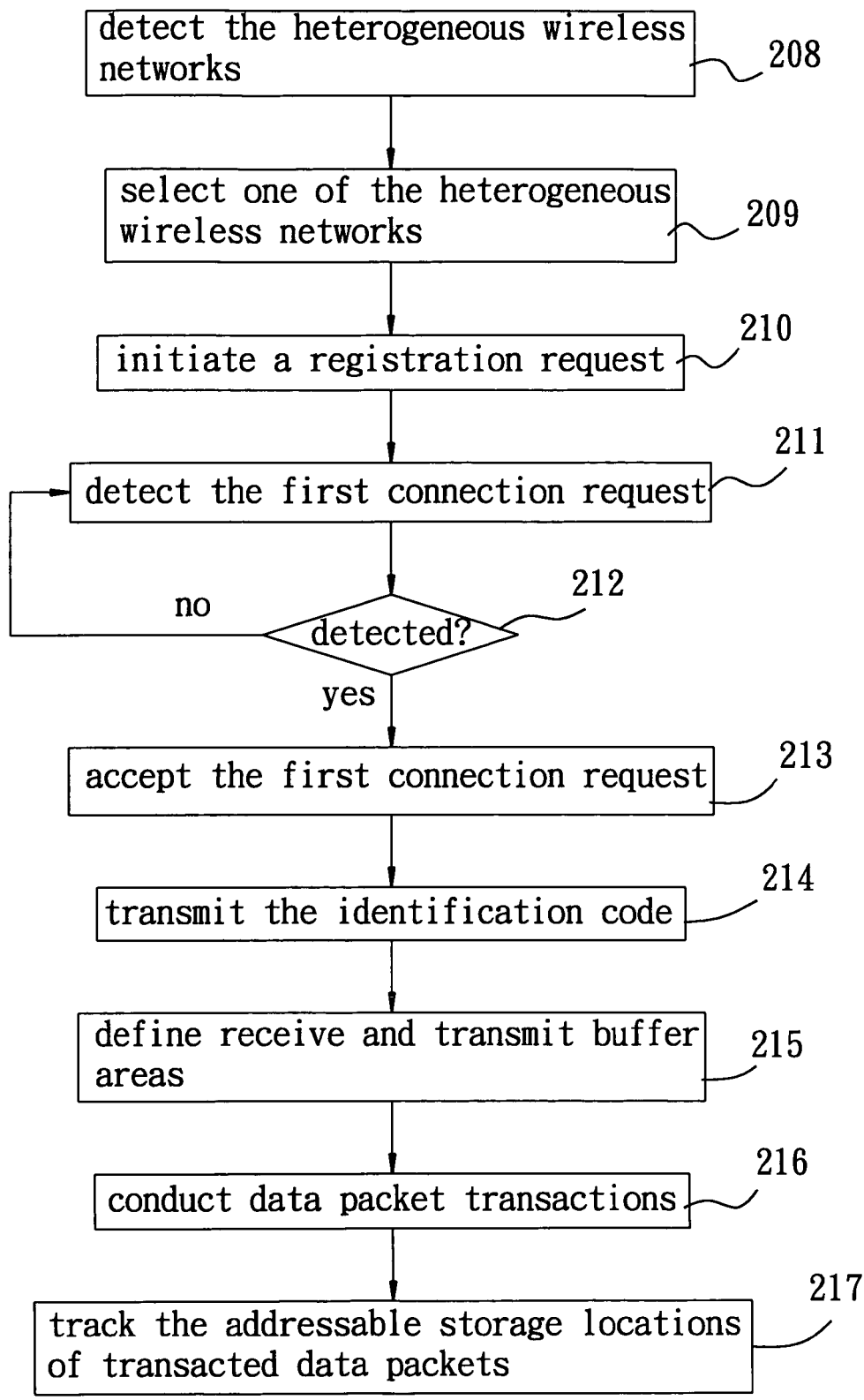

With further reference to FIG. 4C, step 20 further includes the following sub-steps performed by the server 2:

sub-step 208: the server 2 detects the heterogeneous wireless networks 5;

sub-step 209: the server 2 selects one of the heterogeneous wireless networks 5, i.e., the first wireless network;

sub-step 210: the server 2 initiates a registration request to the mapping table 3 that contains the server addresses thereof associated with the first wireless network to obtain the identification code;

sub-step 211: the server 2 detects the first connection request from the client 1 through the first wireless network;

sub-step 212: when the server 2 detects the first connection request from the client 1, the flow proceeds to step 213. Otherwise, the flow goes back to step 211;

sub-step 213: the server 2 accepts the first connection request so as to establish the initial connection with the client 1 through the first wireless network;

sub-step 214: the server 2 transmits the identification code thereof to the client 1 through the initial connection;

sub-step 215: the server 2 defines the receive and transmit buffer areas 42, 41 of the buffer device 4 thereof;

sub-step 216: the server 2 conducts data packet (or dummy signal) transactions with the client 1 through the initial connection; and sub-step 217: the server 2 tracks the addressable storage locations of transacted data packets in the buffer device 4 thereof using the aforementioned pointers thereof.

Figure 4D:
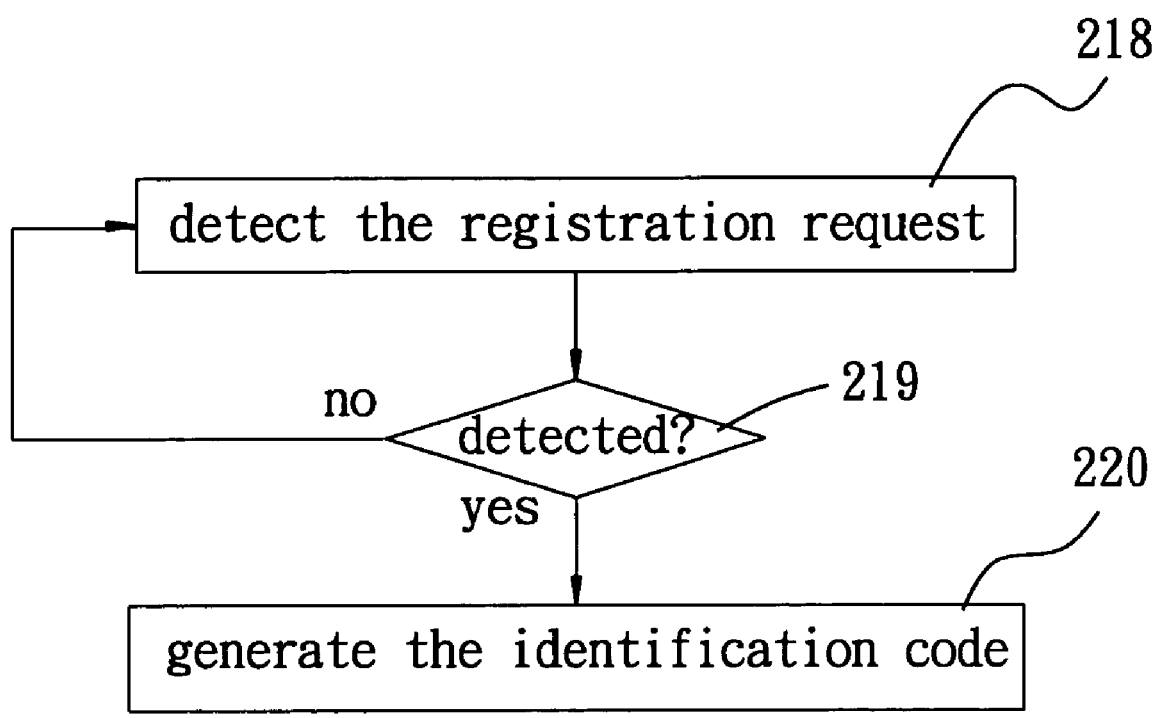

With further reference to FIG. 4D, step 20 further includes the following sub-steps performed by the mapping table server:

sub-step 218: the mapping table server detects the registration request from the server 2;

sub-step 219: when the mapping table server detects the registration request, the flow proceeds to step 220. Otherwise, the flow goes back to sub-step 218; and sub-step 220: the mapping table server generates the identification code, maps the identification code generated thereby to the server addresses in the mapping table 3, and transmits the identification code to the server 2. Thereafter, the flow goes back to step 214.

In step 30, each of the client 1 and the server 2 detects disconnection of the initial connection.

Figure 4E:
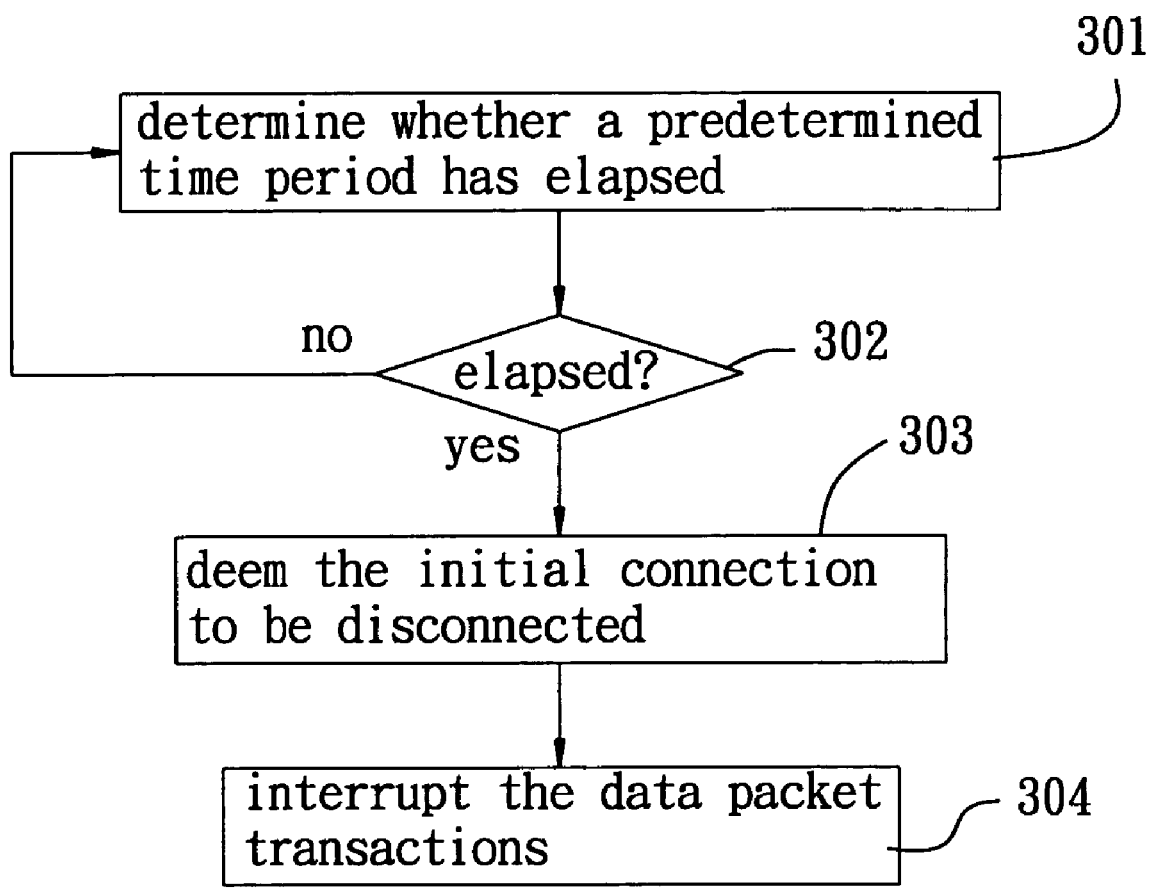

In this embodiment, with further reference to FIG. 4E, step 30 includes the following sub-steps performed by the client 1:

sub-step 301: the client 1 determines whether the predetermined time period has elapsed since the latest receipt of a data packet (or a dummy signal);

sub-step 302: when the client 1 determines that the predetermined time period has elapsed since the latest receipt of a data packet (or a dummy signal), the flow proceeds to step 303. Otherwise, the flow goes back to step 301;

sub-step 303: the client 1 regards the initial connection to be disconnected; and sub-step 304: the client 1 interrupts the data packet transactions with the server 2. That is, the client 1 ceases further transmission of the data packets.

Figure 4F:
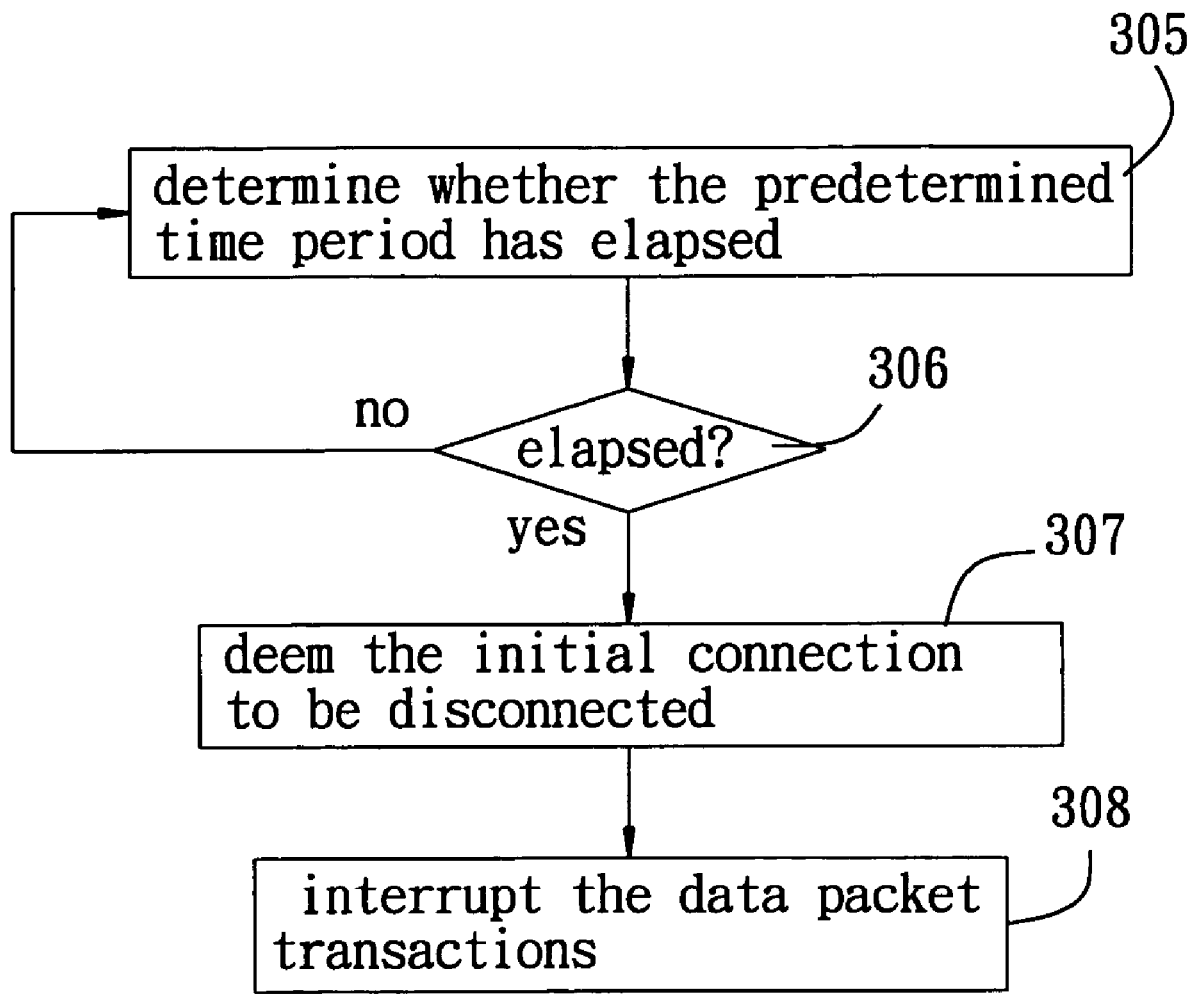

With further reference to FIG. 4F, step 30 further includes the following sub-steps performed by the server 2:

sub-step 305: the server 2 determines whether the predetermined time period has elapsed since the latest receipt of a data packet (or a dummy signal);

sub-step 306: when the server 2 determines that the predetermined time period has elapsed since the latest receipt of a data packet (or a dummy signal), the flow proceeds to step 307. Otherwise, the flow goes back to step 305;

sub-step 307: the server 2 regards the initial connection to be disconnected; and sub-step 308: the server 2 interrupts the data packet transactions with the client 1. That is, the server 2 ceases further transmission of the data packets.

In step 40, the client 1 and the server 2 establish the current connection therebetween through the second wireless network.

Figure 4G:
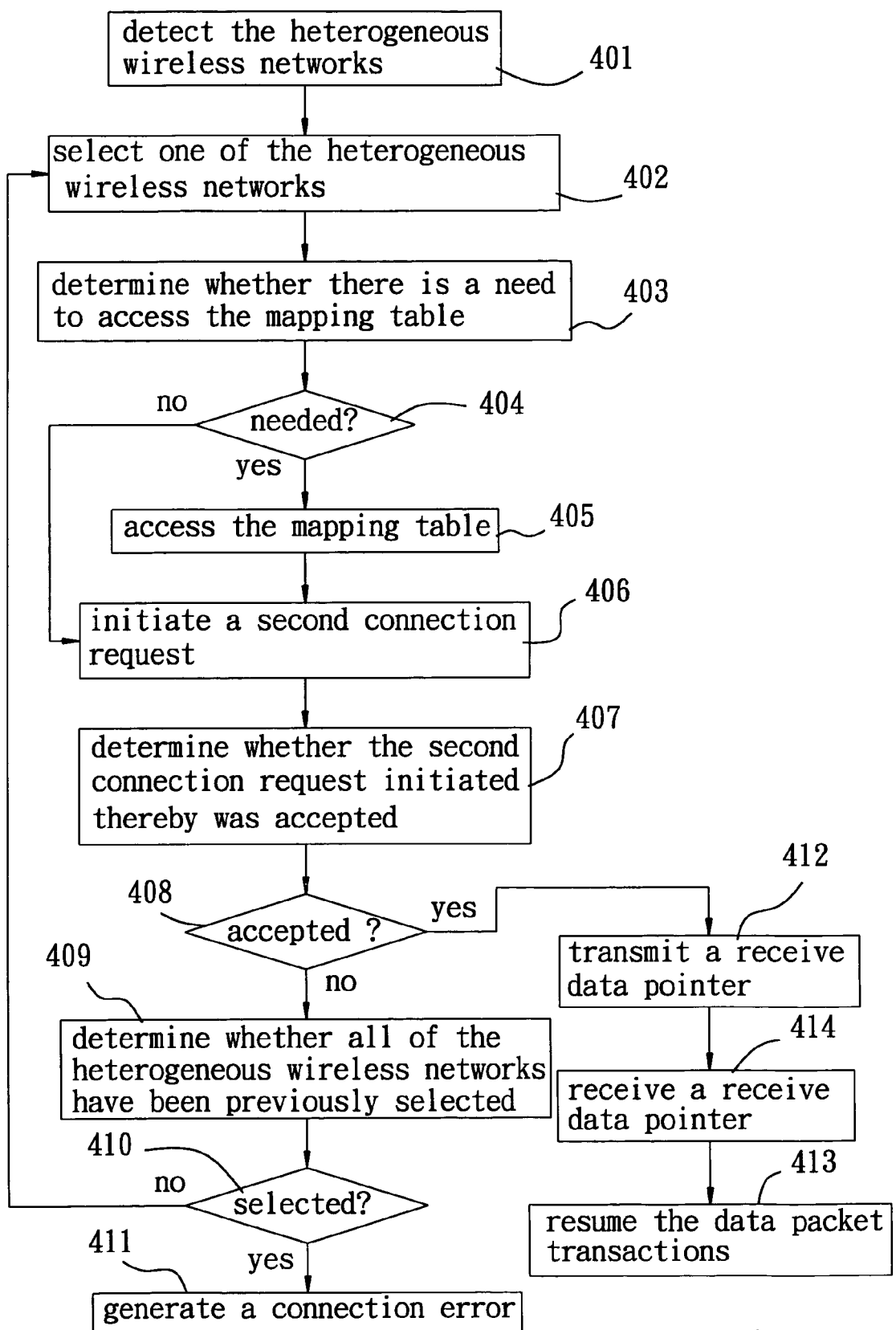

In this embodiment, with further reference to FIG. 4G, step 40 includes the following sub-steps performed by the client 1:

sub-step 401: the client 1 detects the heterogeneous wireless networks 5;

sub-step 402: the client 1 selects one of the heterogeneous wireless networks 5, i.e., the second wireless network;

sub-step 403: the client 1 determines whether there is a need to access the mapping table 3 based on the server address of the server 2 associated with the second wireless network;

sub-step 404: when the client 1 determines that there is a need to access the mapping table 3, i.e., the server address of the server 2 associated with the second wireless network is a dynamic IP address and is therefore not a fixed IP address or a Bluetooth device address, the flow proceeds to step 405. Otherwise, the flow proceeds to step 406.

sub-step 405: the client 1 accesses the mapping table 3, and queries the mapping table 3 using the identification code of the server 2 so as to obtain the server address of the server 2 associated with the second wireless network;

sub-step 406: the client 1 initiates the second connection request to the server 2 that contains the server address of the server 2 associated with the second wireless network such that the current connection is established once the server 2 accepts the second connection request;

sub-step 407: the client 1 determines whether the second connection request initiated thereby was accepted by the server 2;

sub-step 408: when the client 1 determines that the second connection request initiated thereby was accepted by the server 2, the flow proceeds to step 412. Otherwise, the flow proceeds to step 409.

sub-step 409: the client 1 determines whether all of the heterogeneous wireless networks 5 have been previously selected;

Sub-step 410: when the client 1 determines that all of the heterogeneous wireless networks 5 have been selected, the flow proceeds to step 411. Otherwise, the flow goes back to step 402 to change the second wireless network.

sub-step 411: the client 1 generates a connection error;

sub-step 412: the client 1 transmits the receive data pointer thereof to the server 2 through the current connection;

sub-step 413: the client 1 receives the receive data pointer of the server 2 from the server 2 through the current connection; and sub-step 414: the client 1 resumes the data packet transactions with the server 2 with reference to the addressable storage location tracked in sub-step 207, thereby ensuring continuity of the data packet transactions with the server 2.

Figure 4H:
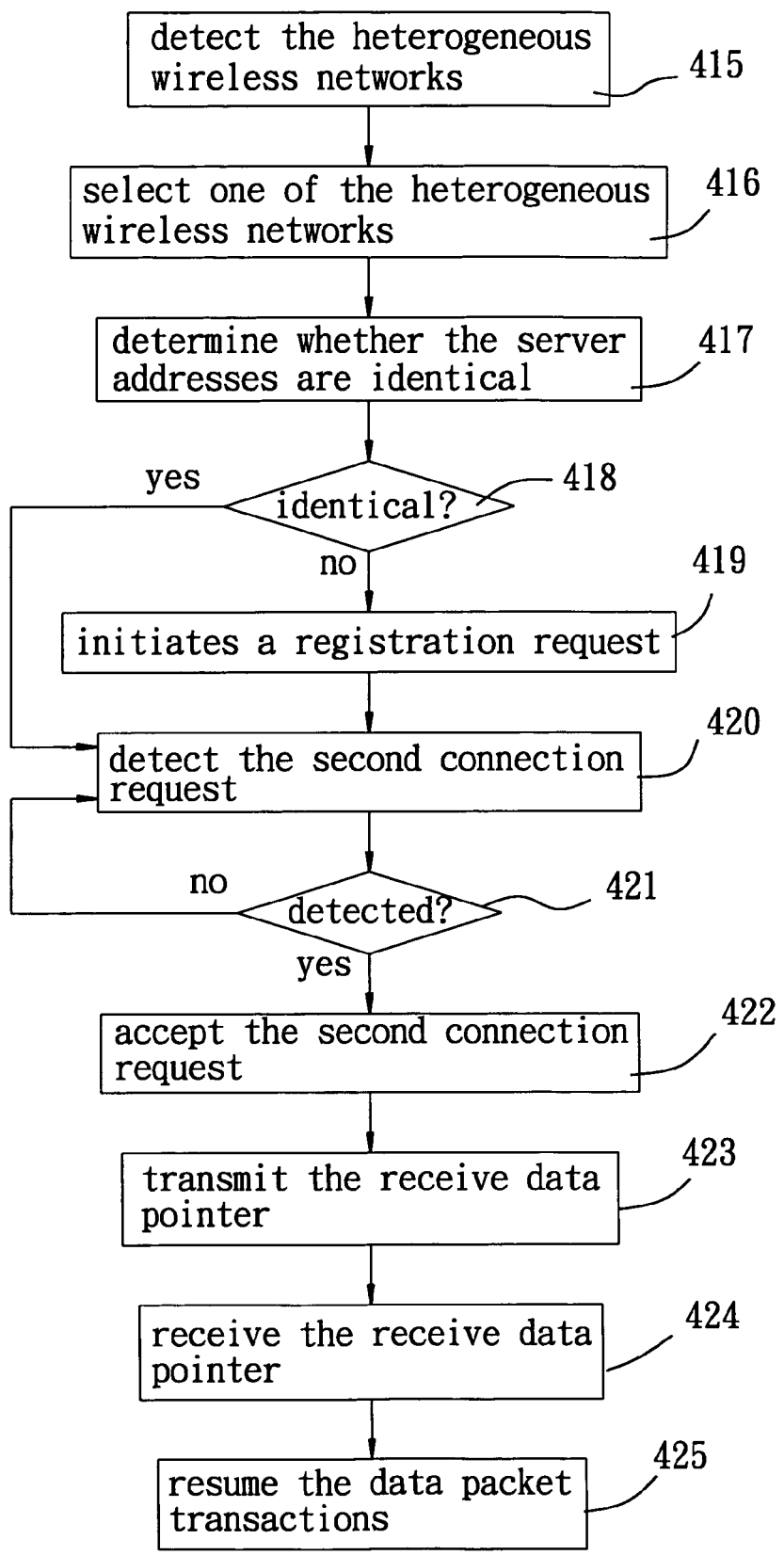

With further reference to FIG. 4H, step 40 includes the following sub-steps performed by the server 2:

sub-step 415: the server 2 detects the heterogeneous wireless networks 5;

sub-step 416: the server 2 selects one of the heterogeneous wireless networks 5;

sub-step 417: the server 2 determines whether the server address thereof associated with the second wireless network is identical to the server address thereof associated with the first wireless network;

sub-step 418: when the server 2 determines that the server address thereof associated with the second wireless network is identical to the server address thereof associated with the first wireless network, the flow proceeds to step 420. Otherwise, the flow proceeds to step 419;

sub-step 419: the server 2 initiates a registration request to the mapping table 3 that contains the server address associated with the second wireless network and the identification code thereof;

sub-step 420: the server 2 detects the second connection request from the client 1 through the second wireless network;

sub-step 421: when the server 2 detects the second connection request from the client 1, the flow proceeds to step 422. Otherwise, the flow goes back to step 420;

sub-step 422: the server 2 accepts the second connection request so as to establish the current connection with client 1 through the second wireless network;

sub-step 423: the server 2 transmits the receive data pointer thereof to the client 1 through the current connection;

sub-step 424: the server 2 receives the receive data pointer of the client 1 from the client 1 through the current connection; and sub-step 425: the server 2 resumes the data packet transactions with the client 1 with reference to the addressable storage location tracked in sub-step 217, thereby ensuring continuity of the data packet transactions with the client 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A roaming method for maintaining connectivity between a client and a server through heterogeneous wireless networks, said roaming method comprising the steps of:
A) providing a mapping table for mapping an identification code of the server to server addresses associated with the heterogeneous wireless networks and registered by the server;
B) establishing an initial connection between the client and the server through a first selected one of the heterogeneous wireless networks;
C) transmitting the identification code of the server to the client through the initial connection established in step B);
D) detecting disconnection of the initial connection; and
E) establishing a current connection between the client and the server through a second selected one of the heterogeneous wireless networks upon detecting that the initial connection has been disconnected in step D), wherein, in step E) the current connection is established
(i) by enabling the client to query the mapping table using the identification code of the server transmitted thereto in step C) so as to obtain the server address associated with the second selected one of the heterogeneous wireless network, and to initiate a second connection request to the server that contains the server address of the server obtained by the client, and
(ii) by enabling the server to accept a second connection request initiated by the client.

2. The roaming method as claimed in claim 1, wherein, in step B), the client and the server are able to conduct data packet transactions therebetween through the initial connection.

3. The roaming method as claimed in claim 2, further comprising, prior to step B), the step of providing each of the client and the server with a buffer device for storing data packets transacted between the client and the server.

4. The roaming method as claimed in claim 3, wherein:
in step B), each of the client and the server tracks addressable storage locations of transacted data packets in the buffer device thereof;
in step D), the data packet transactions between the client and the server are interrupted upon detecting that the initial connection has been disconnected; and
in step E), the data packet transactions between the client and the server are resumed through the current connection with reference to the addressable storage locations tracked in step B), to ensure continuity of the data packet transactions between the client and the server.

5. The roaming method as claimed in claim 4, wherein the buffer device has a receive buffer area for received data packets, and a transmit buffer area for data packets to be transmitted, and in step B), tracking of the addressable storage locations is conducted using a receive data pointer associated with the receive buffer area, and a transmit data pointer associated with the transmit buffer area.

6. The roaming method as claimed in claim 2, wherein, in step B), the client and the server are able to conduct dummy signal transactions therebetween through the initial connection when there are no data packets to be transacted through the initial connection.

7. The roaming method as claimed in claim 1, wherein, in step D), the initial connection is deemed to be disconnected when a predetermined time period has elapsed since a latest signal transaction between the client and the server.

8. The roaming method as claimed in claim 1, wherein each of the server addresses is one of a dynamic internet protocol (IP) address, a fixed IP address, and a device address.

9. The roaming method as claimed in claim 1, wherein, in step B), the initial connection is established by enabling the client to initiate a first connection request to the server that contains the server address associated with the first selected one of the heterogeneous wireless networks such that the initial connection is established once the server accepts the first connection request.

10. The roaming method as claimed in claim 1, wherein, in step B), the initial connection is established by enabling the server to accept a first connection request initiated by the client and that contains the server address associated with the first selected one of the heterogeneous wireless networks.

11. A system operable in heterogeneous wireless networks, said system comprising:

a client and a server configured for establishing an initial connection therebetween through a first selected one of the heterogeneous wireless networks, and for establishing a current connection therebetween through a second selected one of the heterogeneous wireless networks upon detecting that the initial connection has been disconnected, wherein said client and said server are able to maintain connectivity therebetween through the heterogeneous wireless networks;

a mapping table for mapping an identification code of said server to server addresses of said server associated with the heterogeneous wireless networks and registered by said server, wherein said client queries said mapping table using the identification code of said server so as to obtain the server address of said server associated with the second selected one of the heterogeneous wireless networks, and initiates a second connection request to said server that contains the server address of said server obtained by said client, and wherein said server accepts the second connection request from said client so as to establish the current connection.

12. The system as claimed in claim 11, wherein said client and said server are able to conduct data packet transactions therebetween through the initial connection.

13. The system as claimed in claim 12, wherein each of said client and said server is provided with a buffer device for storing data packets transacted between said client and said server.

14. The system as claimed in claim 13, wherein each of said client and said server tracks addressable storage locations of transacted data packets in said buffer device thereof, said client and said server interrupting the data packet transactions therebetween upon detecting that the initial connection has been disconnected, and resuming the data packet transactions therebetween through the current connection with reference to the tracked addressable storage locations to ensure continuity of the data packet transactions therebetween.

15. The system as claimed in claim 14, wherein said buffer device has a receive buffer area for received data packets, and a transmit buffer area for data packets to be transmitted, said client and server conducting tracking of the addressable storage locations using a receive data pointer associated with said receive buffer area, and a transmit data pointer associated with said transmit buffer area.

16. The system as claimed in claim 12, wherein said client and said server are able to conduct dummy signal transactions therebetween through the initial connection when there are no data packets to be transacted through the initial connection.

17. The system as claimed in claim 11, wherein the initial connection is deemed to be disconnected when a predetermined time period has elapsed since a latest signal transaction between said client and said server.

18. The system as claimed in claim 11, wherein each of the server addresses is one of a dynamic internet protocol (IP) address, a fixed IP address, and a device address.

19. The system as claimed in claim 11, wherein said client initiates a first connection request to said server that contains the server address associated with the first selected one of the heterogeneous wireless networks such that the initial connection is established once said server accepts the first connection request.

20. The system as claimed in claim 11, wherein said server accepts a first connection request which is initiated by said client and which contains the server address associated with the first selected one of the heterogeneous wireless networks so as to establish the initial connection.

21. The system as claimed in claim 11, further comprising a set of program instructions for enabling said client and said server to establish the initial connection therebetween through the first selected one of the heterogeneous wireless networks, to detect disconnection of the initial connection, and to establish the current connection therebetween through the second selected one of the heterogeneous wireless networks upon detecting that the initial connection has been disconnected.

* * * * *